United States Patent
Wajs et al.

(10) Patent No.: US 9,660,965 B2
(45) Date of Patent: May 23, 2017

(54) OBTAINING A CONTROL WORD TO REVEAL A CLIENT DEVICE IDENTITY

(75) Inventors: Andrew Augustine Wajs, Hoofddorp (NL); Arnoud Evert Van Foreest, Hoofddorp (NL)

(73) Assignee: IRDETO B.V., LS Hoofddorp (NL)

( * ) Notice: Subject to any disclaimer, the term of this patent is extended or adjusted under 35 U.S.C. 154(b) by 222 days.

(21) Appl. No.: 13/879,347

(22) PCT Filed: Oct. 14, 2011

(86) PCT No.: PCT/EP2011/068001
§ 371 (c)(1),
(2), (4) Date: Apr. 12, 2013

(87) PCT Pub. No.: WO2012/049298
PCT Pub. Date: Apr. 19, 2012

(65) Prior Publication Data
US 2013/0205132 A1    Aug. 8, 2013

(30) Foreign Application Priority Data
Oct. 15, 2010  (EP) .................................... 10187675

(51) Int. Cl.
*G06F 11/30* (2006.01)
*H04L 29/06* (2006.01)
(Continued)

(52) U.S. Cl.
CPC .......... *H04L 63/0428* (2013.01); *G06F 21/10* (2013.01); *H04L 9/0816* (2013.01); *H04L 9/0866* (2013.01); *H04L 9/0869* (2013.01)

(58) Field of Classification Search
CPC .. G06F 9/30007; G06F 9/30018; G06F 21/10; H04L 2209/12; H04L 2209/38;
(Continued)

(56) References Cited

U.S. PATENT DOCUMENTS

| 2002/0071593 A1* | 6/2002 | Muratani ............. G06T 1/0064 382/100 |
| 2008/0219643 A1* | 9/2008 | Le Buhan ................ H04N 5/76 386/291 |

(Continued)

FOREIGN PATENT DOCUMENTS

EP    2 227 015    9/2010    ............. H04N 7/167

OTHER PUBLICATIONS

International Search Report and Written Opinion issued in corresponding PCT Application Serial No. PCT/EP2011/068001, dated Jan. 20, 2012 (12 pgs).
European Search Report issued in corresponding European Application Serial No. EP 10 18 7675, dated Mar. 21, 2011 (7 pgs).
(Continued)

*Primary Examiner* — Kambiz Zand
*Assistant Examiner* — Abiy Getachew
(74) *Attorney, Agent, or Firm* — Rimon PC; Marc S. Kaufman (57) ABSTRACT

The invention provides for a solution enabling obtaining a control word in the client. The client device has a unique binary identification. An input transformed control word is mapped from an input transform domain to an output transform domain to thereby obtain an output transformed control word by successively applying a transformation function to the input transformed control word using each compound of seeds from the set successively as an input to the successive transformation functions. Each of the successive transformation functions is one of a regular transformation function, a first special transformation function and a second special transformation function. The obtained control word can be used to decrypt one of two copies of a part of content data. The copy that can be decrypted contains a watermark representing either a binary "0" or a binary "1" and represents a bit of the unique binary identification of the client device.

24 Claims, 8 Drawing Sheets

(51) Int. Cl.
*G06F 21/10* (2013.01)
*H04L 9/08* (2006.01)

(58) Field of Classification Search
CPC ..... H04L 9/0844; H04L 9/088; H04L 9/0816;
H04L 9/0866; H04L 9/0869; H04L
63/0428; G06K 2209/01; G06K 9/346;
G06T 1/0021; G06T 2201/0051; G06T
2201/0061; G06T 3/0012; H04N 1/40062
USPC ......................................................... 713/193
See application file for complete search history.

(56) References Cited

U.S. PATENT DOCUMENTS

2010/0235624 A1\* 9/2010 Candelore .............. H04N 7/163
713/155
2010/0251285 A1\* 9/2010 Eisen ..................... H04N 7/163
725/31

OTHER PUBLICATIONS

Olivier Billet et al: "Efficient Traitor Tracing from Collusion Secure Codes", Aug. 10, 2008, Information Theoretic Security; (Lecture Notes in Computer Science), Springer Berlin Heidelberg, Berlin, Heidelberg, pp. 171-182 (12 pgs).
Billet O et al: "A Traceable Block Cipher", Asiacrypt. International Conference on the Theory and Application of Cryptology and Information Security, Nov. 1, 2003, pp. 331-346 (16 pgs).
Benny Chor et al: "Tracing Traitors", IEEE Transactions on Information Theory, IEEE, US, vol. 46, No. 3, May 1, 2000, (18 pages).

\* cited by examiner

OBTAINING A CONTROL WORD TO REVEAL A CLIENT DEVICE IDENTITY

FIELD OF THE INVENTION

The present invention relates to obtaining control words in a client device for decrypting content data. More specifically the invention relates to obtaining control words for decrypting watermarked content data to reveal a fingerprint.

BACKGROUND

Various encryption techniques are known for protected provisioning of data from a sender to a receiver, wherein the data is encrypted in the sender using an encryption key, the encrypted data is transmitted to the receiver and the encrypted data is decrypted in the receiver using a decryption key. The encrypted data may be stored before decryption. The decryption key can be provided from the sender to the receiver as well, in which case the decryption key is secret data that needs to be securely provided. If the sender is in control of which receiver is able to obtain the secret data then the secret data is conditionally provided.

E.g. in a conditional access system for pay-tv, premium content is typically scrambled in a head-end system using a control word (CW) as encryption key. The scrambled content is broadcast to conditional access receivers. To allow a receiver to descramble the scrambled content, a smartcard is to be inserted into the receiver. On the smartcard a unique key such as a chipset unique key (CSUK) is securely pre-stored. Through the receiver the smartcard receives from the head-end system an entitlement management message (EMM) comprising a chipset session key (CSSK) encrypted under the CSUK. Using the CSUK the smartcard decrypts CSSK. Through the receiver the smartcard further receives from the head-end system an entitlement control message (ECM) comprising the CW encrypted under the CSSK. Typically the CW has a shorter life time than the CSSK. Therefore the CSSK can be used to decrypt multiple CWs received in multiple ECMs over time. Using the decrypted CSSK the smartcard decrypts the CW, which can subsequently be used by the receiver to descramble the scrambled content. It is known that additional key layers may be used for decrypting the CW.

Manufacturing costs increase as the receiver is made more secure, because attackers develop new techniques over time to violate computing environments, and more sophisticated countermeasures need to be incorporated.

Especially in the pay-tv field, smartcards have been the platform of choice for providing a trusted environment to the receivers. However, though secure, smartcards are expensive both in terms of logistics—as they need to be distributed and tracked—and in terms of component costs. Moreover, as for any other hardware solution, it is difficult and costly to revoke and swap smartcards once deployed in case some flaw has been discovered. That implies that design and development of smartcard application needs to be very careful, and testing very thorough. Moreover, a smartcard does not provide sufficient CPU power to carry out bulk decryption of broadcast content. Therefore the role of the smartcard is mostly limited to relaying the obtained CW to more powerful hardware such as a descrambler in the receiver, either dedicated or general purpose. Such receiver—in turn—disadvantageously has to ensure a minimum degree of confidentiality when communicating to the smartcard, which entails some unique secret, such as a key, shared between the smartcard and the receiver.

A data stream typically comprises one or more content streams, such as e.g. an audio and/or video stream or digital TV stream. A watermark may be inserted into the content stream before encryption by the sender such that it can be detected in the analogue domain after decoding in a receiver. Alternatively the watermark may be inserted at the source of the content or by equipment at the end-user.

Watermarking belongs to the technology field of steganography that deals with hiding of an information signal in watermarked content, such that is substantially impossible to detect by human observers. The content is e.g. a data file or a data stream. The watermark information is substantially irremovable and is immune to manipulation of analog signals, such as audio and/or video signals, that are decoded from the content. Typically, watermarking is used to trace files or streams that are distributed via unauthorized distribution networks.

The information contained in the watermark generally serves to record the path from a studio to a broadcaster. Typically, no further downstream information can be included as the watermark is applied at the broadcast head-end or in the analogue copy obtained from the video content rights holder at the studio.

In a distributive environment the watermark is typically inserted in a data stream by a secure head-end system. Typically a watermark message is inserted into only a part of the content stream.

A fingerprint is a specific type of watermark that is inserted further down the broadcast chain. A fingerprint typically contains information that identifies a receiver of the data stream. Fingerprint information is used in a wide range of forensic applications.

There is a need for an improved solution for securely and conditionally obtaining a control word in a client device that furthermore enables the client device to reveal its identity.

SUMMARY OF THE INVENTION

The invention provides for a solution for securely and conditionally obtaining a control word in a client device that furthermore enables the client device to reveal its identity.

According to an aspect of the invention a method in a client device is proposed for obtaining a control word according to claim 1.

According to an aspect of the invention a client device is proposed for obtaining a control word according to claim 8.

Thus a control word can be securely obtained that is device specific. The output transformed control word is the control word obtained. Moreover, under control of the compounds of seeds, control words can be obtained using different chains of transformation functions. This enables the client device to obtain control words to decrypt a specific copy of content data and thereby reveal a bit of the identity of the client device.

Typically together with a compound of seeds an indication is received whether the compound is to be used with the regular transformation function, the first special transformation function or the second special transformation function. This enables the client device to input the compound to the correct transformation function.

The embodiments of claims 2 and 9 advantageously enable the compounds to be applicable to a specific client device, resulting in redistributed compounds being substantially useless in other client devices.

The embodiments of claims 3 and 10 advantageously enable a variant of the invention wherein the client device receives one transformed input control word from which one control word is obtained.

The embodiments of claims 4 and 11 advantageously enable a variant of the invention wherein the client device receives two transformed input control words from which one control word is obtained.

The embodiments of claims 5 and 12 advantageously enable the obtained control word to be used to decrypt one of two copies of a part of content data. The copy that can be decrypted contains a watermark representing either a binary "0" or a binary "1" and represents a bit of the unique binary identification of the client device.

According to an aspect of the invention a method in a server is proposed according to claim 6 for enabling a client device to reveal a unique binary identification of the client device using the method described above.

According to an aspect of the invention a server is proposed according to claim 13 for enabling a client device to reveal a unique binary identification of the client device having one or more features described above.

Thus the server enables a client device to obtain a control word to be used to decrypt one of two copies of a part of content data. The copy that can be decrypted contains a watermark representing either a binary "0" or a binary "1" and represents a bit of the unique binary identification of the client device.

According to an aspect of the invention a computer program element is proposed, which, when being executed by a processor, is adapted to carry out one or more steps of the method above.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Data and software obfuscation techniques make use of transformation functions to obfuscate intermediate results. The concept of transformation functions differs from encryption, which is clarified in general with reference to FIG. 1.

Figure 1:
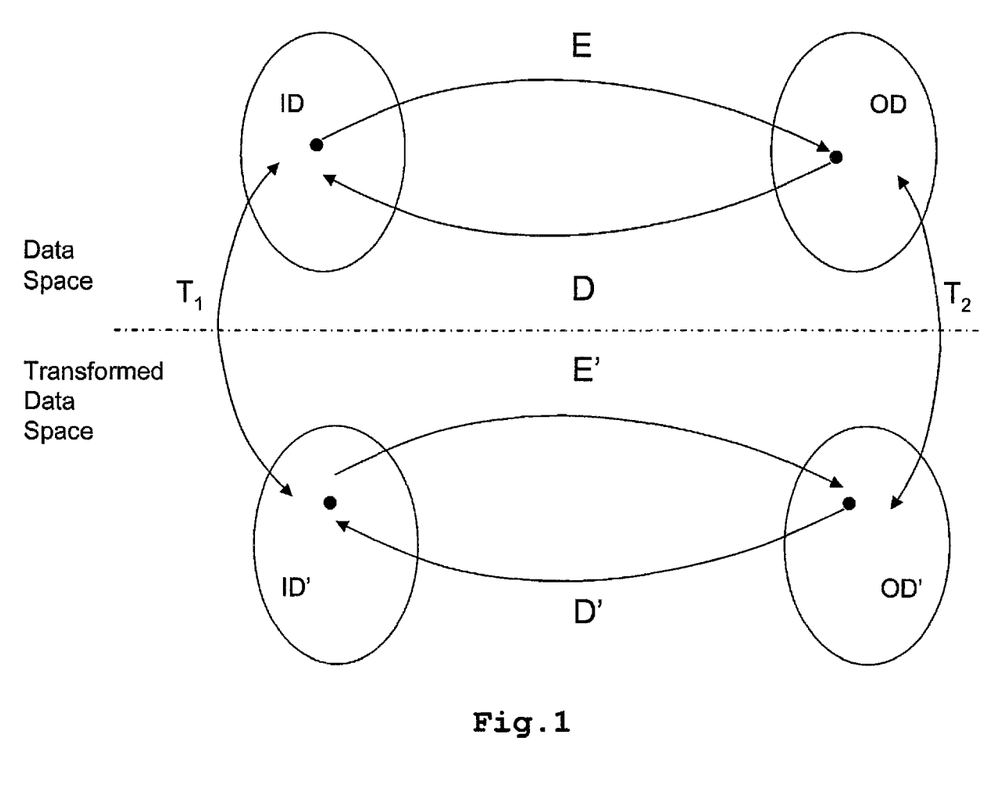
FIG. 1 shows a diagram clarifying transformation functions and encryption in general terms.

Assume, there exists an input domain ID with a plurality of data elements in a non-transformed data space. An encryption function E using some key is defined that is configured to accept the data elements of input domain ID as an input to deliver a corresponding encrypted data element in an output domain OD. By applying a decryption function D, the original data elements of input domain ID can be obtained by applying the decryption function D to the data elements of output domain OD. In a non-secure environment (typically referred to as "white-box"), an adversary is assumed to know input and output data elements and have access to internals of encryption function E during execution. Unless extra precautions are taken in this environment, the key can be derived Additional security can be obtained in a non-secured environment by applying transformation functions to the input domain ID and output domain OD, i.e. the transformation functions are input- and output operations. Transformation function $T_1$ maps data elements from the input domain ID to transformed data elements of transformed input domain ID' of a transformed data space. Similarly, transformation function $T_2$ maps data elements from the output domain OD to the transformed output domain OD'. Transformed encryption and decryption functions E' and D' can now be defined between ID' and OD' using transformed keys. In case inverse transformations are to be performed, e.g. when results are to be communicated to the non-transformed space, $T_1$ and $T_2$ are bijections.

Using transformation functions $T_1$, $T_2$, together with encryption techniques implies that, instead of inputting data elements of input domain ID to encryption function E to obtain encrypted data elements of output domain OD, transformed data elements of domain ID' are input to transformed encryption function E' by applying transformation function $T_1$. Transformed encryption function E' combines the inverse transformation function $T_1^{-1}$ and the transformation function $T_2$ in the encryption operation to protect the confidential information, such as the key. Then transformed encrypted data elements of domain OD' are obtained. Keys for encryption functions E or decryption function D cannot be retrieved when analyzing input data and output data in the transformed data space.

One of the transformation functions $T_1$, $T_2$ should be a non-trivial function. In case, $T_1$ is a trivial function, the input domains ID and ID' are the same domain. In case, $T_2$ is a trivial function, the output domains are the same domain.

Figure 2A:
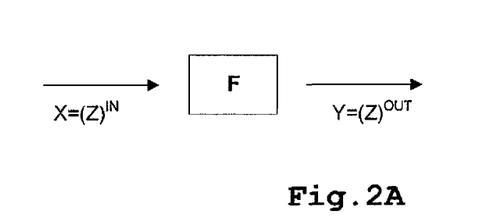
FIG. 2A shows a block diagram of a function performing a mathematical transformation.

The function F shown in FIG. 2A is a mathematical operation that migrates data Z across two different transform spaces identified by IN and OUT. The dimension of the output transform space OUT is at least as large as the input transform space IN, and any data Z is represented (possibly not uniquely) in both input and output transform spaces as X and Y respectively. The function F is designed such that it is difficult to run in reverse direction. Because no apparent mapping between the input and output transform spaces exists and the dimension of transform spaces IN and OUT is preferably significantly large, recreation of the function F is prevented. Moreover, the function F is implemented in such a way that it is difficult to extract the data Z as it passes through the function, e.g. using white-box techniques and/or other code obfuscation techniques.

With reference to FIG. 2A, function F is e.g. defined as $Y=F(X)=3*X+2$. If the input transform space IN is a clear text transform space, then $X=(Z)^{IN}=Z$. After migration the following result is obtained: $Y=(Z)^{OUT}=3*X+2$. To migrate Z from the output transform space to the clear text transform space again, a reverse function $F^{-1}(Y)=(Y-2)/3$ must be available to obtain X as follows: $F^{-1}(Y)=(3*X+2-2)/3=X$. In this example Z, X and Y are numbers that can be used to transform using simple addition and subtraction mathematics. It is to be understood that Z, X and Y can be data in any data format, including binary values, numbers, characters, words, and etcetera. The function F can be a more complex function and suitable for operation on e.g. binary values, numbers, characters or words.

Figure 2B:
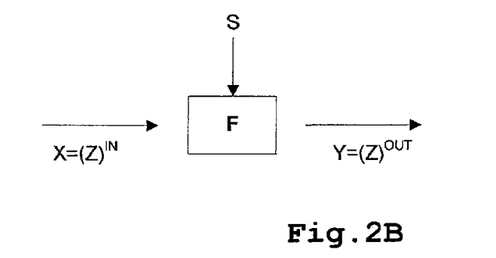
FIG. 2B shows a block diagram of a function performing a mathematical transformation under control of a seed.

The function F can be defined as a mathematical operation that can be seeded with an additional parameter S, as shown in FIG. 2B. The migration that the function F performs is typically defined by the seed S. Typically, no information about the input space IN and output space OUT is embedded into F. The function F is chosen such that manipulation of input data X or seed S yields an unpredictable resulting data Y in the output transform space. The seed S does not need to be secured or stored in a secure environment as the seed S is engineered in such a way that no information about transform space IN or OUT can be extracted.

With reference to FIG. 2B, function F is e.g. defined as $F(X,S)=X-7+S$. If the input transform space IN is a clear text transform space, then $X=(Z)^{IN}=Z$. After migration the following result is thus obtained: $Y=(Z)^{OUT}=X-7+S=Z-7+S$. If e.g. a seed S is provided as data comprising the value of 5, then $F(X,5)=X-7+5$ and $Y=(Z)^{OUT}=X-7+5=Z-2$. To migrate Z from the output transform space to the clear text transform space again, a reverse function $F^{-1}(Y,S)=Y+7-S$ must be available to obtain X as follows: $F^{-1}(Y,S)=(X-7+5)+7-S$. If the seed $S=5$ is known, then Z can correctly be obtained as: $F^{-1}(Y,5)=(X-7+5)+7-5=X=Z$.

If the input transform space IN is not a clear text transform space, then function F typically first performs a reverse transformation in the input transform space IN and next a transformation in the output transform space OUT. Such function F is e.g. defined as $F(X,S_1,S_2)=F_2(F_1^{-1}(X,S_1),S_2)$, wherein $F_1^{-1}(X,S_1)=X-2-S_1$ and $F_2(X,S_2)=X-7+S_2$. After migration the following result is thus obtained: $Y=(Z)^{OUT}=(X-2-S_1)-7+S_2=X-9-S_1+S_2$, wherein $X=(Z)^{IN}$.

Seeds $S_1$ and $S_2$ can be provided as two separate seeds to first perform $F_1^{-1}(X,S_1)$ and next perform $F_2(X,S_2)$, or more preferably as a compound of seeds $<S_1,S_2>$. Generally, a compound of seeds is a mixture of multiple seeds. From the mixture of multiple seeds the individual seeds are not derivable. A parameter mixing function for mixing the seeds $S_1$ and $S_2$ is denoted as: $f(S_1,S_2)=<S_1,S_2>$. The function result $<S_1,S_2>$ is called the compound of seeds $S_1$ and $S_2$. In the example above, if $S_1=5$ and $S_2=7$, then one compound is $<S_1,S_2>=5-7=-2$.

In the above examples Z, X, Y and S are numbers that can be used to transform using simple addition and subtraction mathematics. It will be understood that Z, X, Y and S can be data in any data format, including binary values, numbers, characters, words, and etcetera. The function F can be a more complex function and suitable for operation on e.g. binary values, numbers, characters or words.

Figure 3A:
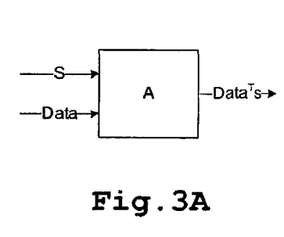
FIG. 3A shows a block diagram of an apply primitive.
Figure 3B:
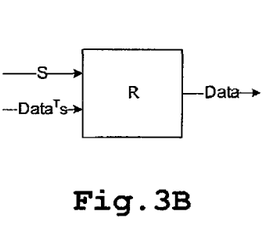
FIG. 3B shows a block diagram of a remove primitive.
Figure 3C:
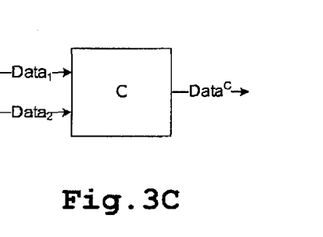
FIG. 3C shows a block diagram of a condition primitive.

The obfuscation technology typically uses basic primitives or a combination thereof to obscure data or software code transformations. Examples of basic primitives are an apply primitive, a remove primitive and a condition primitive. FIG. 3A, FIG. 3B and FIG. 3C show block diagrams of an apply primitive A, a remove primitive R and a condition primitive C, respectively.

In FIG. 3A the function $A(Data,S)=A_S(Data)=Data^{Ts}$ defines an apply primitive that transforms an input Data into a transformed $Data^{Ts}$ using an input seed S. In FIG. 3B the function $R(Data^{Ts},S)=R_S(Data^{Ts})=Data$ defines a remove primitive that reverses the transformation of an input $Data^{Ts}$ using a seed S to obtain an output Data. The seed S need to be identical for the two functions A ( ) and R ( ) to become the inverse of each other.

The original Data and its transformed variant $Data^{Ts}$ are typically of a same size, i.e. represented by a same number of bits, making it impossible to determine, based on its size, whether or not the Data is in a particular transformed space.

In FIG. 3C the function $C(Data_1,Data_2)=C_{Data1}(Data_2)=Data^C$ defines a conditional transformation wherein the output $Data^C$ is a correlation of the two inputs $Data_1$ and $Data_2$. The condition primitive typically preserves the size of the input data and output data, making it impossible to determine whether or not the Data is the result of a correlation.

Primitives such as the apply primitive, remove primitive and the condition primitive can be combined. The combination produces a new operation wherein the individual primitives are invisible.

Figure 3D:
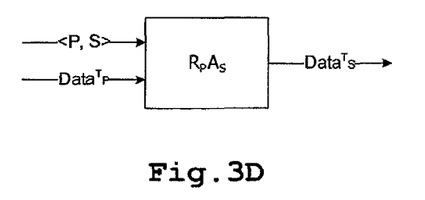
FIG. 3D shows a block diagram of a combination of a remove and an apply primitive.

FIG. 3D shows an example of a combination of a remove and an apply primitive. The transformation operation uses a compound $<P,S>$ as input to the combined remove and apply operation applied to input $Data^{Tp}$. The $R_PA_S$ function maps the input $Data^{Tp}$ from input transform domain P to output transform domain S to obtain output $Data^{Ts}$. All inputs and outputs of the combined remove and apply operation are either transformed or in the form of a compound. The operation is applied to transformed data and produces transformed data. Thus the transformation operation takes place in transformed domain spaces and reveals no individual parameters or untransformed data on any of the interfaces. The function used to produce the compound $<P,S>$ is preferably unique and linked to the implementation of the combined apply and remove operation.

Figure 3E:
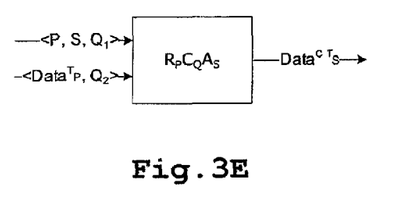
FIG. 3E shows a block diagram of a secure correlation of compounds.

FIG. 3E shows an example of a secured correlation operation on two input compounds $<P,S,Q_1>$ and $<Data^{Tp}, Q_2>$. The $R_PC_QA_S$ function combines a remove, condition and apply primitive to thereby create output $Data^{CTs}$.

Figure 4:
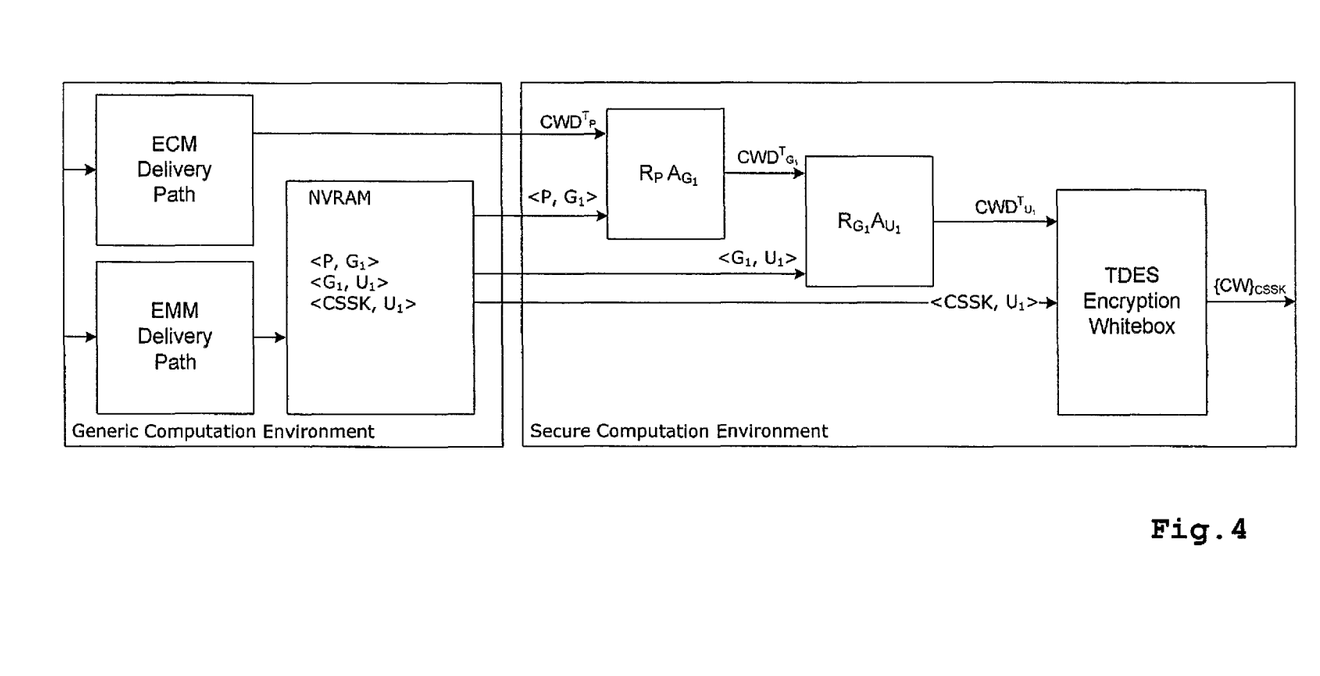
FIG. 4 shows an example of a receiver applying transformation operations to obtain a control word.

FIG. 4 shows an example of a transformation path implemented in a receiver of a conditional access receiver. The receiver is typically implemented at least partly as software or as a field-programmable gate array (FPGA) program in a programmable array. The receiver comprises an unprotected, partially protected and/or secure memory of a processor. The processor is configured to execute functions stored in the memory to migrate a secret data Z from an input transform space IN to an output transform space OUT. The secret data Z cannot be extracted or intercepted and thus cannot e.g. be illegally distributed to other receivers.

The receiver receives a control word CW as a globally transformed control word $CWD^T_P$ in an entitlement control message ECM. The receiver migrates the CWD from the input transform space P into the final output transform space CSSK of the receiver in three steps. The last migration step creates a transformed control word $\{CW\}_{CSSK}$, which is the control word CW in the output transform space of the cluster shared secret key (CSSK) that is unique to the receiver.

The receiver comprises a generic computation environment and a secure computation environment.

The generic computation environment comprises an ECM Delivery Path for receiving the ECM from the head-end system. The generic computation environment further comprises an EMM Delivery Path for receiving an Entitlement Management Messages (EMM) from the head-end system. The EMM comprises the compounds of seeds that are used to migrate $CWD^T_P$ through the various transform spaces along the path of the transformation path. The set of compounds of seeds received in the EMM are stored in a NVRAM memory of the generic computation environment. A first seed equals the compound $<P,G_1>$. A second seed equals the compound $<G_1,U_1>$. A third seed equals the compound $<CSSK,U_1>$.

The secure computation environment comprises a sequence of transformation functions. A first function $R_P A_{G1}$ transforms $CWD^T_P$ from the input transform space P to the output transform space $G_1$ using the compound $<P,G_1>$ as seed input. Subsequently a second function $R_{G1} A_{U1}$ transforms $CWD^T_{G1}$, i.e. the CW in the transform space $G_1$, from the input transform space $G_1$ to the output transform space $U_1$ using the compound $<G_1,U_1>$. Subsequently a third function, in this example a TDES Whitebox Encryption function, transforms $CWD^T_{U1}$, i.e. the CW in the transform space $U_1$, from the input transform space $U_1$ to the output transform space CSSK. The resulting $\{CW\}_{CSSK}$ is the CW encrypted under the CSSK key, which can be decrypted by the conditional access receiver using the CSSK that is pre-stored in a secured memory of the receiver or securely derivable by the receiver.

It is to be understood that the transformation path in the receiver is not limited to the example shown in FIG. 4 and may contain any number and any kind of transformation operations.

Figure 5:
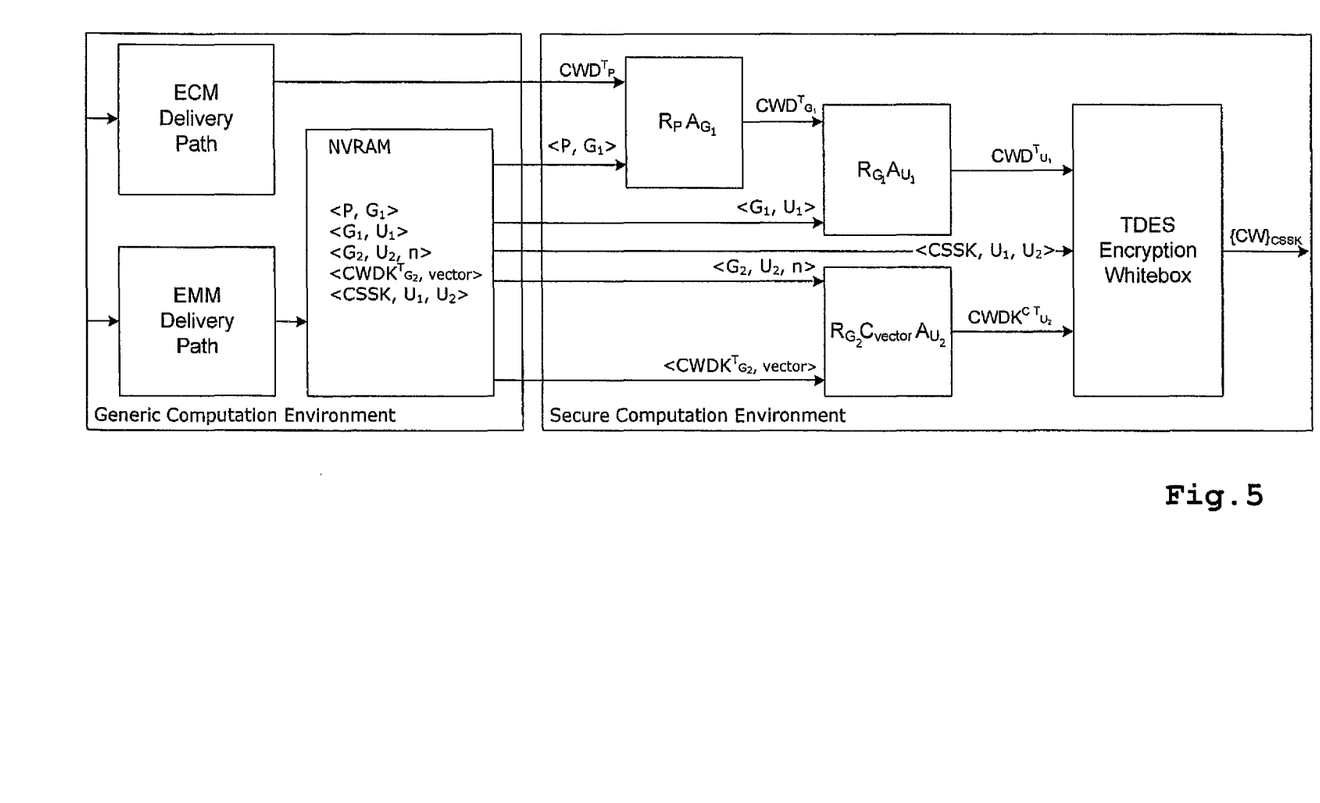
FIG. 5 shows another example of a receiver applying transformation operations to obtain a control word.

FIG. 5 shows another example of a transformation path implemented in a receiver of a conditional access receiver, wherein the CW is split into subkeys and a membership check is coupled to entitlement processing. The two level key hierarchy is similar to the one described in the example of FIG. 3. Additionally, the receiver has a secure correlation instance to implement the group membership check. The result of the correlation stage is the computation of a Control Word Difference Key CWDK. In the example of FIG. 4 both the CWDK subkey and the CWD subkey are required to calculate the CW. The CW is calculated in the TDES Encryption Whitebox, e.g. by adding the CWDK value to the CWD value. Depending on the implementation other computations may be used to calculate CW from CWDK and CWD, such as e.g. multiplying CWDK and CWD, subtracting CWDK from CWD or applying any predefined function to CWDK and CWD. The TDES Encryption Whitebox encrypts the CW using the local CSSK. The additional calculation only needs to be performed after an EMM update to the CWDK compound $<CWDK^{TG2},vector>$ although more frequent re-calculations may occur. When there are no changes to the membership, the compound can remain unchanged. Typically, the CWDK is common to all members of the group. The unique element to the receiver is the membership group number 'n', which can stay unchanged. The conditional processing thus enables a lower conditional access data bandwidth as the CWDK compound is an efficient method to manage group membership.

Thus, the $CWD^T$ carried in the ECM is not the actual CW or key used to scramble, but rather one from which the scrambling key can be derived through a chain of transformations and possibly other mathematical operations.

Figure 6:
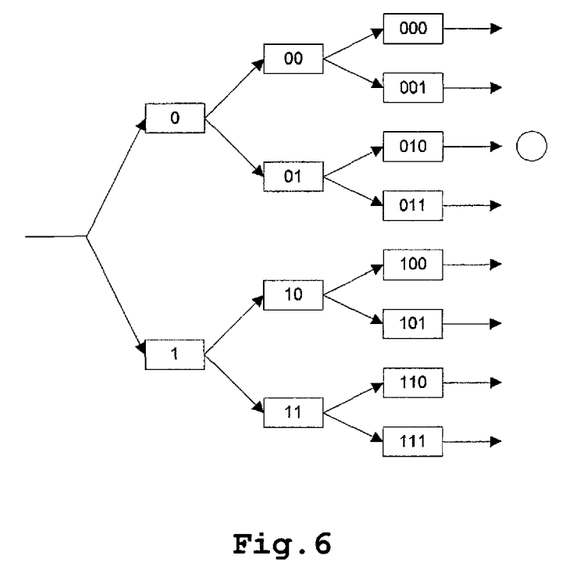
FIG. 6 shows a visualization of a deployment of receivers in a conditional access system as a binary tree.

In a conditional access system each receiver device is assigned a unique binary identification. FIG. 6 visualizes a deployment of receivers in a conditional access system as a binary tree. In the example of FIG. 6 the conditional access system has eight devices with 3-bit binary identifications 000, 001, 010, 011, 100, 101, 110 and 111. The device marked by the dot is assigned the position 010 in the binary tree, which corresponds to the unique binary identification 010.

Figure 7:
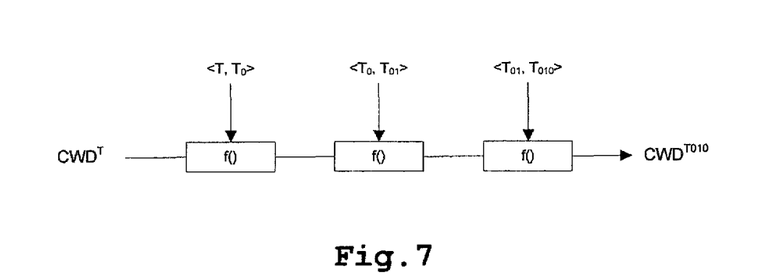
FIG. 7 shows an example of a chain of transformations.

The path through the binary tree for one device can be represented by a chain of transformations, as indicated in FIG. 7. Each next step in the binary tree corresponds to a next bit of the unique identification of the device. Each function f( ) is a function that, given an input compound of seeds $<X,Y>$, maps its input from the $T_X$ transform domain to an output in the $T_Y$ transform domain, i.e. the equivalent of:

$$f(z,<X,Y>)=T_Y(T^{-1}_X(z))$$

Each device is provisioned with a unique combination of compounds, ultimately defining the device's unique output transformation domain. In the example of FIG. 6 and FIG. 7 the device at position "010" is provisioned with the set of compounds $<T,T_0>$, $<T_0,T_{01}>$ and $<T_{01},T_{010}>$, enabling a transformation of global input $CWD^T$ to the uniquely transformed output $CWD^{T010}$.

The receivers shown in FIG. 4 and FIG. 5 are examples of receivers implementing a chain of transformation as shown in FIG. 7.

To enable the receiver to reveal its unique binary identification, a server, such as a head-end system in the conditional access system, provides the receiver with two copies of parts of content. Each copy is watermarked with either a binary zero or a binary one. Furthermore each part is encrypted using different control words. Hereto a content generator in the head-end system generates the first copy of a part of the content and the second copy of the part of the content. A watermark inserter adds a watermark representing a binary 'zero' to the first copy a watermark representing a binary value 'one' to the second copy. An encryptor encrypts the first watermarked copy with a first control word to obtain a first encrypted copy and encrypts the second watermarked copy with a second control word to obtain a second encrypted copy. The thus obtained encrypted copies of the part of the content are both transmitted to the receiver.

In the head-end system a set of compounds of seeds is generated for a particular device. The compounds are used to transform the first control word or the second control word by applying a transformation function. The thus obtained transformed control word is transmitted to the receiver, typically in an ECM. The set of compounds of seeds needed by the receiver to reverse the transformation is transmitted to the receiver, typically in an EMM.

The receiver uses the received set of compounds as input to a chain of transformations as shown in FIG. 7 to transform the received transformed control word $CWD^T$ to a device specific output transform space $CWD^{T010}$. The CW derived from the $CWD^{TO10}$ can be used to correctly decrypt only one of the two copies of the part of the content. The correctly decrypted copy reveals one bit of the unique binary identification of the receiver, as will be explained. The other copy, which is either decrypted into non-meaningful data or cannot be decrypted at all, is discarded by the receiver.

To enable the chain of transformations to transform the input $CWD^T$ to a particular output $CWD^{TO10}$ for revealing one bit of the unique binary identification, an additional series of transformation functions is embedded in the receiver. Each function represents an alternative step in the chain of transformations that can be selected based on the device's identity. The correct selection of a function is enforced through the fact that any other selection, as a result of e.g. tampering, would break the transformation chain.

Functions $f_{Ai}$ ( ) and $f_{Bi}$ ( ) are functions in the additional series of transformation functions that, given a compound of seeds <X,Y>, map their input from the $T_X$ transform domain to an output in the $T_Y$ transform domain, whilst removing the transform $T_{Ai}$ or $T_{Bi}$ respectively, i.e. the equivalent of:

$$f_{Ai}(z,<X,Y>_A)=T_Y(T^{-1}_{Ai}(T^{-1}_X(z)))$$

$$f_{Bi}(z,<X,Y>_B)=T_Y(T^{-1}_{Bi}(T^{-1}_X(z)))$$

The functions $f_{Ai}$ ( ) and $f_{Bi}$ ( ) and their respective transforms $T_{Ai}$ and $T_{Bi}$ are unique and specific to the i-th bit of the identity for which the watermarked is to be revealed. The compound representations <X,Y>, <X,Y>$_A$ and <X,Y>$_B$ are typically incompatible.

The chain of transformations, such as shown in FIG. 7, is provided with the additional functions $f_{Ai}$ ( ) and $f_{Bi}$ ( ). In addition to the regular transform seeds used as input to the functions as shown in FIG. 7, each device is provisioned with a unique combination of compounds, giving the device its unique identity for the purpose of watermarking. In the example of the device at position "010", the device is e.g. provisioned with the following set of compounds: <T,T$_0$>$_A$, <T$_0$,T$_{01}$>$_B$ and <T$_{01}$,T$_{010}$>$_A$.

The combination of regular compounds and special compounds to reveal the watermark enables the receiver, for every bit 'i' of the unique identification, to transform only one of two global inputs $CWD^{TAiT}$ or $CWD^{TBiT}$ to a uniquely transformed output $CWD^{TO10}$.

Typically together with a compound of seeds an indication is received whether the compound is to be used with the regular transformation function f ( ), the first special transformation function $f_{Ai}$ ( ) or the second special transformation function $f_{Bi}$ ( ). This enables the receiver to input the compound to the correct transformation function.

Figure 8A:
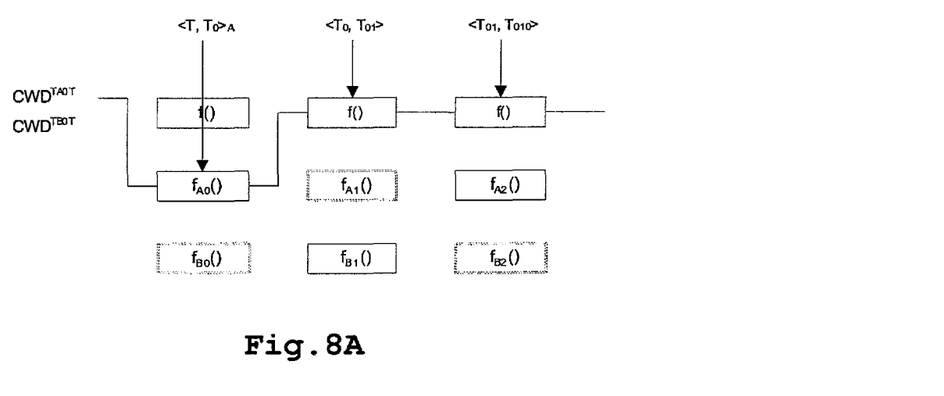
FIG. 8A shows a chain of transformations in a receiver of an exemplary embodiment of the invention.
Figure 8B:
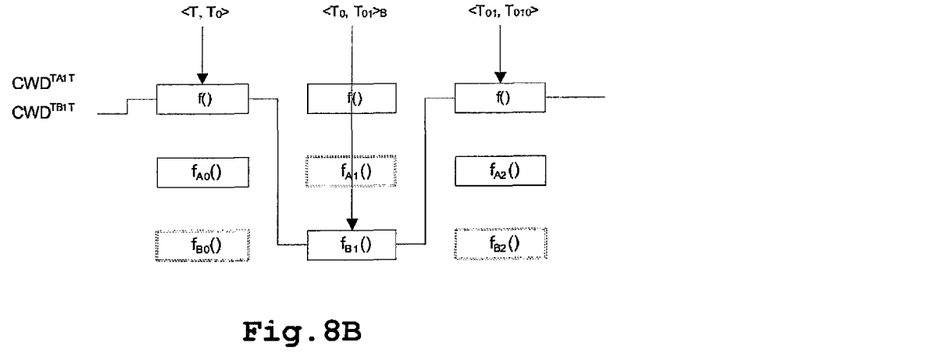
FIG. 8B shows another chain of transformations in a receiver of an exemplary embodiment of the invention.
Figure 8C:
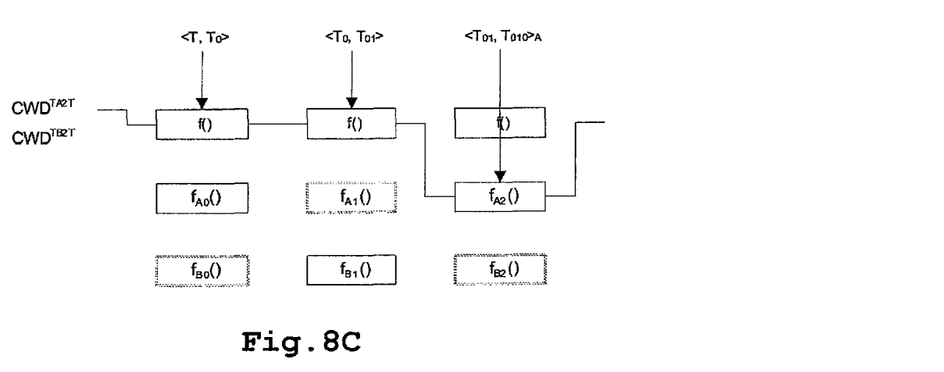
FIG. 8C shows another chain of transformations in a receiver of an exemplary embodiment of the invention.

The path through the binary tree for one device including the special functions $f_{Ai}$ ( ) and $f_{Bi}$ ( ) can be represented by a chain of transformations, as indicated in FIGS. 8A, 8B and 8C. In this example the path has three sequential transformation operations to transform an input $CWD^T$ into an output $CWD^{TO10}$. Therefore i has the values 1, 2 and 3 for the sequential special functions $f_{Ai}$ ( ) and $f_{Bi}$ ( ). In FIG. 8A $CWD^{TO10}$ is obtained to reveal the first bit of the unique identity of the device. In FIG. 8B $CWD^{TO10}$ is obtained to reveal the second bit of the unique identity of the device. In FIG. 8C $CWD^{TO10}$ is obtained to reveal the third bit of the unique identity of the device.

With reference to FIG. 8A, the device at position "010" would be able to successfully transform $CWD^{T40T}$ to $CWD^{TO10}$, whilst it would not be able to successfully process $CWD^{TB0T}$ as input due to the lack of the transform seed to drive $f_{B0}$ ( ). As the two CWD values are different, each protecting a differently watermarked copy of the same part of the content, this guarantees that only the copy of the part of the content carrying the desired watermarking information can be descrambled correctly exposing the first bit of the device's identity.

With reference to FIG. 8B, the device at position "010" would be able to successfully transform $CWD^{TB1T}$ to $CWD^{TO10}$, whilst it would not be able to successfully process $CWD^{T41T}$ as input due to the lack of the transform seed to drive $f_{A1}$ ( ). As the two CWD values are different, each protecting a differently watermarked copy of the same part of the content, this guarantees that only the copy of the part of the content carrying the desired watermarking information can be descrambled correctly exposing the second bit of the device's identity.

With reference to FIG. 8C, the device at position "010" would be able to successfully transform $CWD^{T42T}$ to $CWD^{TO10}$, whilst it would not be able to successfully process $CWD^{TB2T}$ as input due to the lack of the transform seed to drive $f_{B2}$ ( ). As the two CWD values are different, each protecting a differently watermarked copy of the same part of the content, this guarantees that only the copy of the part of the content carrying the desired watermarking information can be descrambled correctly exposing the third bit of the device's identity.

In the examples of FIGS. 8A, 8B and 8C two independent CWs are used for the two watermarked copies of the part of the content. However, it is also possible to introduce a dependency between the two CWs on the head-end and only carry a single $CWD^T$ in the ECM.

Figure 9:
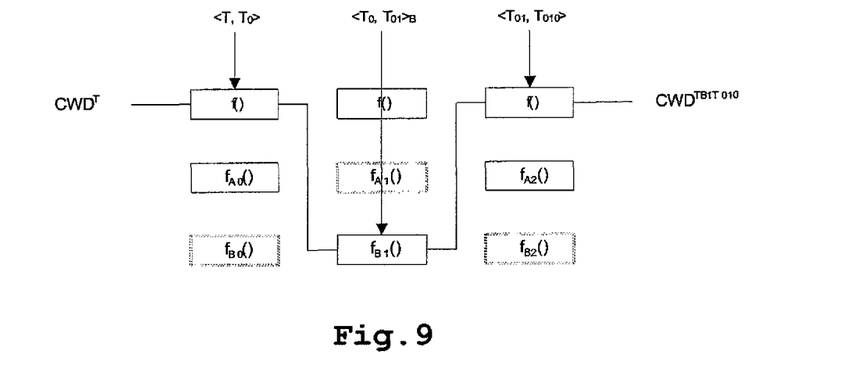
FIG. 9 shows another chain of transformations in a receiver of an exemplary embodiment of the invention.

FIG. 9 shows an alternative implementation wherein a single $CWD^T$ is received in a receiver. As there are two copies of a part of the content, each having another binary watermark, depending on the provided set of compounds there are two possible derivations yielding either the actual key for the "0"-watermarked packet of the i-th bit (here referred to as $CWD^{TAi}$), or that for the "1"-watermarked packet (here referred to as $CWD^{TBi}$). Based on the path through the binary tree, and the transform chain being applied, the single input $CWD^T$ is transformed into either one of two outputs $CWD^{TAiTu}$ or $CWD^{TBiTu}$, where $T_u$ refers to the unique transform at the output of the binary tree.

In the example of FIG. 9 the function $f_{B1}$ ( ) is defined as:

$$f_{B1}(z<X,Y>_B)=T_Y(T_{B1}(T^{-1}_X(z)))$$

An accompanying function, to apply $T_{B1}$ (or $T_{A1}$ in another receiver) would be available on the head-end to derive the CWs from the $CWD^T$ that is carried in the ECM.

In the example of FIG. 9 only a single $CWD^T$ needs to be carried in the ECM, thus saving bandwidth. Moreover it is hidden that watermarking is being applied, as there is no noticeable difference between "regular" ECMs carrying CWs and the ECMs carrying $CWD^T$ during watermarking.

In a conditional access system the parts of the content are e.g. video packet elementary stream (PES) packets. In the head-end system a PES packet is copied, watermarked and scrambled or encrypted using a different CW for each copy of the PES packet. ECMs containing CWs for decrypting the PES packet carry the CWs for both copies of the PES packet as well as an indicator for the bit number of the identity for which the watermark is being trigger.

In the receiver the watermarked PES packets that do not correspond to the device's watermark identity may be filtered out. For example, if bit 0 of the identity is a "1", the receiver may throw away the watermarked PES packet that represents the "0" and keep the packet that represents "1" in the video stream. The kept PES packet may be stored to a disk in the receiver for later playback.

Figure 10:
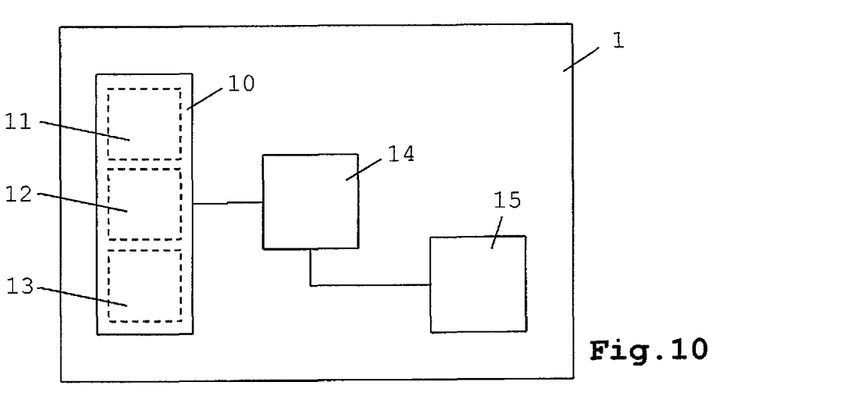
FIG. 10 shows a client of an exemplary embodiment of the invention.

FIG. 10 shows a simplified example of a client device. The client is e.g. a CA receiver in a conditional access system such as shown in FIG. 4 or FIG. 5. The client device 1 has a first receiver 11 to receive an input transformed control word, such as e.g. $CWD^{T40T}$ and $CWD^{TB0T}$ as shown in FIG. 8A or $CWD^T$ as shown in FIG. 9. The client device 1 has a second receiver 12 to receive a set of compounds of seeds for each bit of the unique binary identification, such as e.g. $\{<T,T_0>_A,<T_0,T_{01}>,<T_{01},T_{010}>\}$ as shown in FIG. 8A or $\{<T,T_0>,<T_0,T_{01}>_B,<T_{01},T_{010}>\}$ as shown in FIG. 9. The first and second receiver can be one and the same, which is indicated by receiver element 10.

A processor 14 is configured to map the input transformed control word from the input transform domain to the output transform domain to thereby obtain the output transformed control word by successively applying a transformation function to the input transformed control word using each compound of seeds from the set successively as an input to the successive transformation functions. In the example of FIG. 8A functions $f_{40}()$, $f()$ and $f()$ are successively applied using as input the compounds $<T,T_0>_A$, $<T_0,T_{01}>$ and $<T_{01},T_{010}>$, respectively. In the example of FIG. 9 the functions $f()$, $f_{B1}()$ and $f()$ are successively applied using as input the compounds $<T,T_0>$, $<T_0,T_{01}>_B$ and $<T_{01},T_{010}>$, respectively. Each of the successive transformation functions is one of a regular transformation function $f()$, a first special transformation function $f_{Ai}()$ and a second special transformation function $f_{Bi}()$.

The processor is configured to input one of the compounds of seeds from the set to one of the first special transformation function and the second special transformation function. In the example of FIG. 8A the compound of $<T,T_0>_A$ is input to the special function $f_{40}()$ as the first bit of the identification of the receiver "010" equals "0". Would the first bit have equaled "1", the $f_{B0}()$ would have been applied.

The processor is configured to input the other compounds of seeds from the set to the regular transformation function $f()$.

The client device 1 can have a third receiver 13 configured to receive for each bit of the unique binary identification a first copy of a part of the content data and a second copy of the part of the content data. The third receiver and the first and second receivers can be one and the same, which is indicated by receiver element 10.

The first received copy has a first watermark representing a bit value of zero and is encrypted with a first control word. The second copy has a second watermark representing a bit value of one and is encrypted with a second control word different from the first control word.

The control word obtained in the client device after going through the chain of transformations and possibly other mathematical operations is either the first control word or the second control word.

A decryptor 15 decrypts the first copy of the part of the content data and/or the second copy of the part of the content data using the control word to thereby obtain a decrypted part of the content data. The thus obtained decrypted copy of the content data is either the first copy or the second copy, as only one of the two copies can be decrypted using the obtained CW. The decrypted copy contains the watermark the bit value of which corresponds to the bit value of the bit of the unique binary identification. In the example of FIG. 8A the copy contains the watermark with bit value "0", i.e. corresponding to the first bit of the binary identification "010" of the client device.

Figure 11:
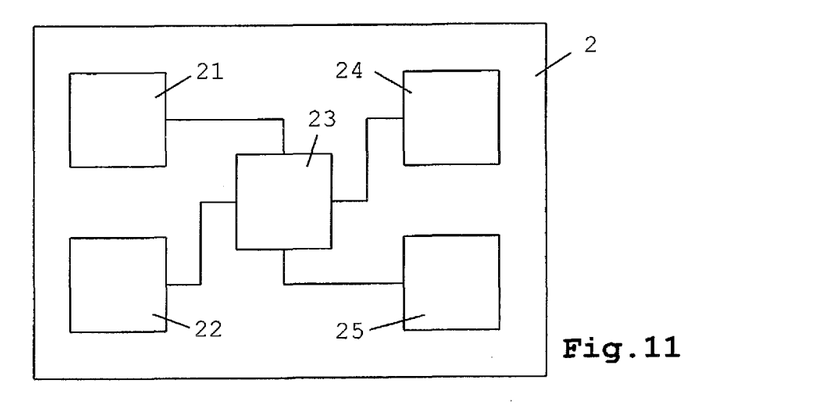
FIG. 11 shows a server of an exemplary embodiment of the invention.

FIG. 11 shows a simplified example of a server. The server is e.g. a head-end system in a conditional access system. The server 2 enables the client device 1 to reveal the unique binary identification of the client device. The server has a content generator 21 to generate a first copy of a part of a content data and a second copy of the part of the content data. Watermark inserter 22 watermarks the first copy with a first watermark representing a bit value of zero the second copy with a second watermark representing a bit value of one. Encryptor 24 encrypts the first watermarked copy with a first control word and the second watermarked copy with a second control word. Processor 23 is configured to generate a set of compounds of seeds and to transform the first control word or the second control word by applying a transformation function to thereby obtain an input transformed control word for the client device 1. Transmitter 25 transmits the first copy, the second copy, the input transformed control word and the set of compounds of seeds to the client device 1.

Figure 12:
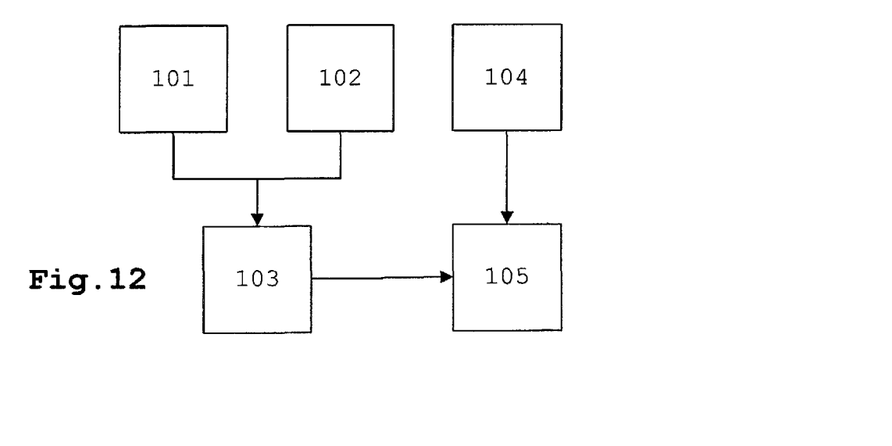
FIG. 12 shows a flow chart of steps of a method in a client of an exemplary embodiment of the invention.

FIG. 12 shows a simplified example of a flowchart with steps performed by a client device such as the client device 1 of FIG. 10. In step 101 the input transformed control word is received. In step 102 the set of compounds of seeds is received for each bit of the unique binary identification. In step 103 the input transformed control word from the input transform domain is mapped to the output transform domain to thereby obtain the output transformed control word by successively applying the transformation function to the input transformed control word using each compound of seeds from the set successively as input to the successive transformation functions. Each of the successive transformation functions is one of a regular transformation function, a first special transformation function and a second special transformation function, as explained. One of the compounds of seeds from the set is input to one of the first special transformation function and the second special transformation function. The other compounds of seeds from the set are input to the regular transformation function.

In step 104 for each bit of the unique binary identification a first copy of a part of the content data and a second copy of the part of the content data are received. The first copy comprising a first watermark representing a bit value of zero and encrypted with a first control word. The second copy comprising a second watermark representing a bit value of one and encrypted with a second control word. The by the client obtained control word is the first control word or the second control word. Alternatively the first control word or the second control word is derivable from the obtained control word.

In step 105 the first copy of the part of the content data and/or the second copy of the part of the content data is decrypted using the control word to thereby obtain the decrypted part of the content data comprising one of the first watermark and the second watermark the bit value of which corresponds to the bit value of the bit of the unique binary identification.

Figure 13:
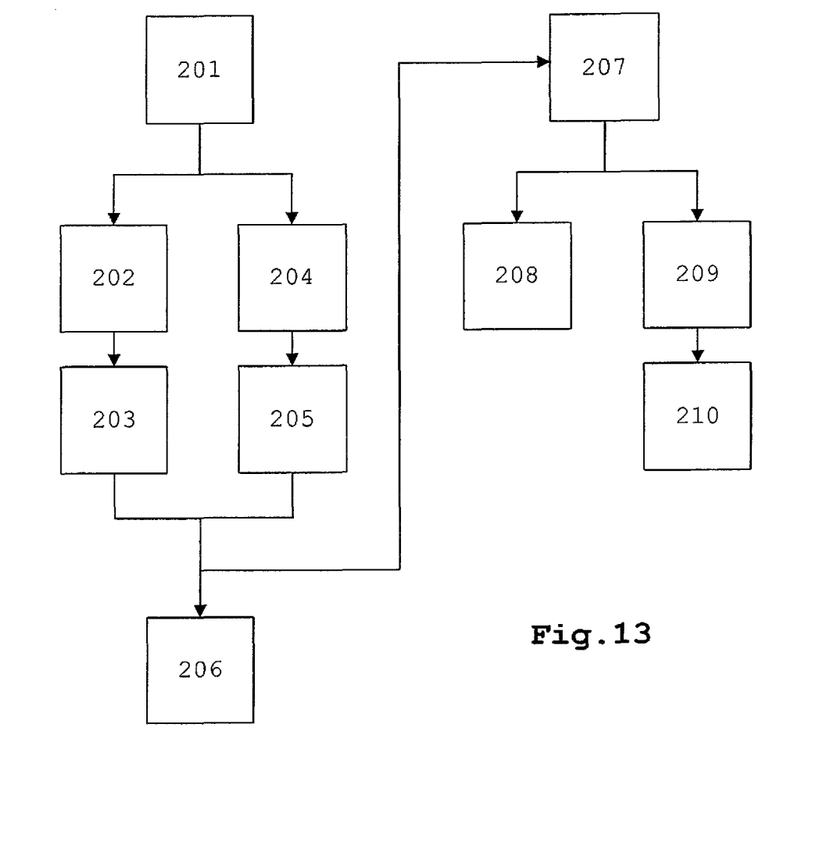
FIG. 13 shows a flow chart of steps of a method in a server of an exemplary embodiment of the invention.

FIG. 13 shows a simplified example of a flowchart with steps performed by a server such as the server 2 of FIG. 11. In step 201 the first copy of a part of a content data and the second copy of the part of the content data are generated. In step 202 the first copy is watermarked with a first watermark representing a bit value of zero to obtain a first watermarked copy. In step 203 the first watermarked copy is encrypted with a first control word to obtain a first encrypted copy. In step 204 the second copy is watermarked with a second watermark representing a bit value of one to obtain a second watermarked copy. In step 205 the second watermarked copy is encrypted with a second control word to obtain a second encrypted copy. In step 206 the first copy and the second copy are transmitted to the client device 1, where they are received in step 104 of FIG. 12. In step 207 the first control word or the second control word is transformed to thereby obtain the input transformed control word. In step 208 the input transformed control word is transmitted to the client device 1, where it is received in step 101 of FIG. 12. In step 209 the set of compounds of seeds are generated. In step 210 the set of compounds of seeds are transmitted to the client device 1, where it is received in step 102 of FIG. 12.

It is to be understood that any feature described in relation to any one embodiment may be used alone, or in combination with other features described, and may also be used in combination with one or more features of any other of the embodiments, or any combination of any other of the embodiments. One embodiment of the invention may be implemented as a program product for use with a computer system. The program(s) of the program product define functions of the embodiments (including the methods described herein) and can be contained on a variety of computer-readable non-transitory storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory or flash memory) on which alterable information is stored. Moreover, the invention is not limited to the embodiments described above, which may be varied within the scope of the accompanying claims.

The invention claimed is:

1. Method in a client device for obtaining a control word associated with a value of a particular bit of a unique binary identification of the client device, the method comprising:
receiving an input transformed control word;
receiving a set of compounds of seeds, wherein each compound of seeds is associated with a respective bit of the unique binary identification; and
mapping the input transformed control word from an input transform domain to an output transform domain to thereby obtain an output transformed control word by applying a sequence of transformation functions to the input transformed control word using each compound of seeds from the set successively as an input to a respective transformation function of the sequence,
wherein each of the transformation functions is one of a regular transformation function, a first special transformation function and a second special transformation function,
wherein the compound of seeds associated with the particular bit is, according to the value of the particular bit, input to either the first special transformation function or the second special transformation function,
and wherein the other compounds of seeds from the set are input to the regular transformation function.

2. The method according to claim 1, wherein each first special transformation function and each second special transformation function is unique.

3. The method according to claim 2, wherein a single input transformed control word is received and wherein the first special transformation function and the second special transformation function comprise a unique mathematical operation for adding a transform.

4. The method according to claim 2, wherein two different input transformed control words are received, wherein the first special transformation function and the second special transformation function comprise a unique mathematical operation for removing a transform, and wherein the output transformed control word is obtained for each input transformed control word.

5. The method according to claim 1 further for revealing the unique binary identification of the client device from a content data, the method further comprising:
receiving for each bit of the unique binary identification a first copy of a part of the content data and a second copy of the part of the content data, the first copy comprising a first watermark representing a bit value of zero and encrypted with a first control word, the second copy comprising a second watermark representing a bit value of one and encrypted with a second control word, the control word being one of the first control word and the second control word or wherein one of the first control word and the second control word is derivable from the control word;
decrypting the first copy of the part of the content data and/or the second copy of the part of the content data using the control word or one of the first control word and the second control word derived from the control word to thereby obtain a decrypted part of the content data comprising one of the first watermark and the second watermark the bit value of which corresponds to the bit value of the particular bit of the unique binary identification.

6. A method in a server for enabling a client device to reveal a unique binary identification of the client device using the method according to claim 5, the method comprising for each bit of the unique binary identification:
generating a first copy of a part of a content data and a second copy of the part of the content data;
watermarking the first copy with a first watermark representing a bit value of zero to obtain a first watermarked copy and encrypting the first watermarked copy with a first control word to obtain a first encrypted copy;
watermarking the second copy with a second watermark representing a bit value of one to obtain a second watermarked copy and encrypting the second watermarked copy with a second control word to obtain a second encrypted copy;
transmitting the first copy and the second copy to the client device;
transforming the first control word or the second control word to thereby obtain an input transformed control word;
transmitting the input transformed control word to the client device;
generating and transmitting a set of compounds of seeds to the client device, wherein each compound of seeds is associated with a respective bit of the unique binary identification of the client device.

7. A computer readable non-transitory medium storing computer executable instructions for carrying out the method of claim 1.

8. A client device for obtaining a control word associated with a value of a particular bit of a unique binary identification of the client device comprising:
a first receiver configured to receive an input transformed control word;

a second receiver configured to receive a set of compounds of seeds, wherein each compound of seeds is associated with a respective bit of the unique binary identification; and a processor configured to map the input transformed control word from an input transform domain to an output transform domain to thereby obtain an output transformed control word by applying a sequence of transformation functions to the input transformed control word using each compound of seeds from the set successively as an input to a respective transformation function of the sequence, wherein each of the successive transformation functions is one of a regular transformation function, a first special transformation function and a second special transformation function, wherein the processor is configured to input the compound of seeds associated with the particular bit, according to the value of the particular bit, to either the first special transformation function or the second special transformation function, and wherein the processor is configured to input the other compounds of seeds from the set to the regular transformation function.

9. The client device according to claim 8, wherein each first special transformation function and each second special transformation function is unique.

10. The client device according to claim 9, wherein the first receiver is configured to receive a single input transformed control word and wherein the first special transformation function and the second special transformation function comprise a unique mathematical operation for adding a transform.

11. The client device according to claim 9, wherein the first receiver is configured to receive two different input transformed control words, wherein the first special transformation function and the second special transformation function comprise a unique mathematical operation of removing a transform, and wherein the processor is configured to obtain the output transformed control word for each input transformed control word.

12. The client device according to claim 8 further for revealing the unique binary identification of the client device from a content data, the client device further comprising:

a third receiver configured to receive for each bit of the unique binary identification a first copy of a part of the content data and a second copy of the part of the content data, the first copy comprising a first watermark representing a bit value of zero and encrypted with a first control word, the second copy comprising a second watermark representing a bit value of one and encrypted with a second control word, the control word being one of the first control word and the second control word or wherein one of the first control word and the second control word is derivable from the control word; and a decryptor configured to decrypt the first copy of the part of the content data and/or the second copy of the part of the content data using the control word or one of the first control word and the second control word derived from the control word to thereby obtain a decrypted part of the content data comprising one of the first watermark and the second watermark the bit value of which corresponds to the bit value of the particular bit of the unique binary identification.

13. A server for enabling a client device according to claim 12 to reveal a unique binary identification of the client device, the server comprising:

a content generator configured to generate a first copy of a part of a content data and a second copy of the part of the content data;

a watermark inserter configured to watermark the first copy with a first watermark representing a bit value of zero to obtain a first watermarked copy and configured to watermark the second copy with a second watermark representing a bit value of one to obtain a second watermarked copy;

an encryptor configured to encrypt the first watermarked copy with a first control word to obtain a first encrypted copy and configured to encrypt the second watermarked copy with a second control word to obtain a second encrypted copy;

a processor configured generate a set of compounds of seeds and configured to transform the first control word or the second control word by applying a transformation function to thereby obtain an input transformed control word;

a transmitter configured to transmit the first copy, the second copy, the input transformed control word and the set of compounds of seeds to the client device, wherein each compound of seeds is associated with a respective bit of the unique binary identification of the client device.

14. A computer readable non-transitory medium storing computer executable instructions for carrying out the method of claim 2.

15. A computer readable non-transitory medium storing computer executable instructions for carrying out the method of claim 3.

16. A computer readable non-transitory medium storing computer executable instructions for carrying out the method of claim 4.

17. A computer readable non-transitory medium storing computer executable instructions for carrying out the method of claim 5.

18. A computer readable non-transitory medium storing computer executable instructions for carrying out the method of claim 6.

19. The client device according to claim 9 further for revealing the unique binary identification of the client device from a content data, the client device further comprising:

a third receiver configured to receive for each bit of the unique binary identification a first copy of a part of the content data and a second copy of the part of the content data, the first copy comprising a first watermark representing a bit value of zero and encrypted with a first control word, the second copy comprising a second watermark representing a bit value of one and encrypted with a second control word, the control word being one of the first control word and the second control word or wherein one of the first control word and the second control word is derivable from the control word; and a decryptor configured to decrypt the first copy of the part of the content data and/or the second copy of the part of the content data using the control word or one of the first control word and the second control word derived from the control word to thereby obtain a decrypted part of the content data comprising one of the first watermark and the second watermark the bit value of which corresponds to the bit value of the particular bit of the unique binary identification.

20. The client device according to claim 10 further for revealing the unique binary identification of the client device from a content data, the client device further comprising:
a third receiver configured to receive for each bit of the unique binary identification a first copy of a part of the content data and a second copy of the part of the content data, the first copy comprising a first watermark representing a bit value of zero and encrypted with a first control word, the second copy comprising a second watermark representing a bit value of one and encrypted with a second control word, the control word being one of the first control word and the second control word or wherein one of the first control word and the second control word is derivable from the control word; and
a decryptor configured to decrypt the first copy of the part of the content data and/or the second copy of the part of the content data using the control word or one of the first control word and the second control word derived from the control word to thereby obtain a decrypted part of the content data comprising one of the first watermark and the second watermark the bit value of which corresponds to the bit value of the particular bit of the unique binary identification.

21. The client device according to claim 11 further for revealing the unique binary identification of the client device from a content data, the client device further comprising:
a third receiver configured to receive for each bit of the unique binary identification a first copy of a part of the content data and a second copy of the part of the content data, the first copy comprising a first watermark representing a bit value of zero and encrypted with a first control word, the second copy comprising a second watermark representing a bit value of one and encrypted with a second control word, the control word being one of the first control word and the second control word or wherein one of the first control word and the second control word is derivable from the control word; and
a decryptor configured to decrypt the first copy of the part of the content data and/or the second copy of the part of the content data using the control word or one of the first control word and the second control word derived from the control word to thereby obtain a decrypted part of the content data comprising one of the first watermark and the second watermark the bit value of which corresponds to the bit value of the particular bit of the unique binary identification.

22. A server for enabling the client device according to claim 19 to reveal a unique binary identification of the client device, the server comprising:
a content generator configured to generate a first copy of a part of a content data and a second copy of the part of the content data;
a watermark inserter configured to watermark the first copy with a first watermark representing a bit value of zero to obtain a first watermarked copy and configured to watermark the second copy with a second watermark representing a bit value of one to obtain a second watermarked copy;
an encryptor configured to encrypt the first watermarked copy with a first control word to obtain a first encrypted copy and configured to encrypt the second watermarked copy with a second control word to obtain a second encrypted copy;
a processor configured generate a set of compounds of seeds and configured to transform the first control word or the second control word by applying a transformation function to thereby obtain an input transformed control word;
a transmitter configured to transmit the first copy, the second copy, the input transformed control word and the set of compounds of seeds to the client device, wherein each compound of seeds is associated with a respective bit of the unique binary identification of the client device.

23. A server for enabling the client device according to claim 20 to reveal a unique binary identification of the client device, the server comprising:
a content generator configured to generate a first copy of a part of a content data and a second copy of the part of the content data;
a watermark inserter configured to watermark the first copy with a first watermark representing a bit value of zero to obtain a first watermarked copy and configured to watermark
the second copy with a second watermark representing a bit value of one to obtain a second watermarked copy;
an encryptor configured to encrypt the first watermarked copy with a first control word to obtain a first encrypted copy and configured to encrypt the second watermarked copy with a second control word to obtain a second encrypted copy;
a processor configured generate a set of compounds of seeds and configured to transform the first control word or the second control word by applying a transformation function to thereby obtain an input transformed control word;
a transmitter configured to transmit the first copy, the second copy, the input transformed control word and the set of compounds of seeds to the client device, wherein each compound of seeds is associated with a respective bit of the unique binary identification of the client device.

24. A server for enabling the client device according to claim 21 to reveal a unique binary identification of the client device, the server comprising:
a content generator configured to generate a first copy of a part of a content data and a second copy of the part of the content data;
a watermark inserter configured to watermark the first copy with a first watermark representing a bit value of zero to obtain a first watermarked copy and configured to watermark the second copy with a second watermark representing a bit value of one to obtain a second watermarked copy;
an encryptor configured to encrypt the first watermarked copy with a first control word to obtain a first encrypted copy and configured to encrypt the second watermarked copy with a second control word to obtain a second encrypted copy;
a processor configured generate a set of compounds of seeds and configured to transform the first control word or the second control word by applying a transformation function to thereby obtain an input transformed control word;
a transmitter configured to transmit the first copy, the second copy, the input transformed control word and the set of compounds of seeds to the client device, wherein each compound of seeds is associated with a respective bit of the unique binary identification of the client device.

* * * * *